(No Model.)

E. B. BREWER.
SECTIONAL NUT.

No. 561,758.   Patented June 9, 1896.

Witnesses:
J. D. Garfield
K. J. Clemons

Inventor,
Edwin B. Brewer,
by Chapin & Lee
Attorneys.

UNITED STATES PATENT OFFICE.

EDWIN B. BREWER, OF NORTHAMPTON, MASSACHUSETTS.

SECTIONAL NUT.

SPECIFICATION forming part of Letters Patent No. 561,758, dated June 9, 1896.

Application filed February 14, 1896. Serial No. 579,238. (No model.)

*To all whom it may concern:*

Be it known that I, EDWIN B. BREWER, a citizen of the United States of America, residing at Northampton, (Florence,) in the county of Hampshire and State of Massachusetts, have invented new and useful Improvements in Sectional Nuts, of which the following is a specification.

This invention relates to tapered bolts and the expansible nuts therefor used by quarrymen, &c., and has for its object the improvement in devices for securing together the various portions of the nut; and it consists in the improved construction as fully described and claimed in the following specification.

Figure 1:
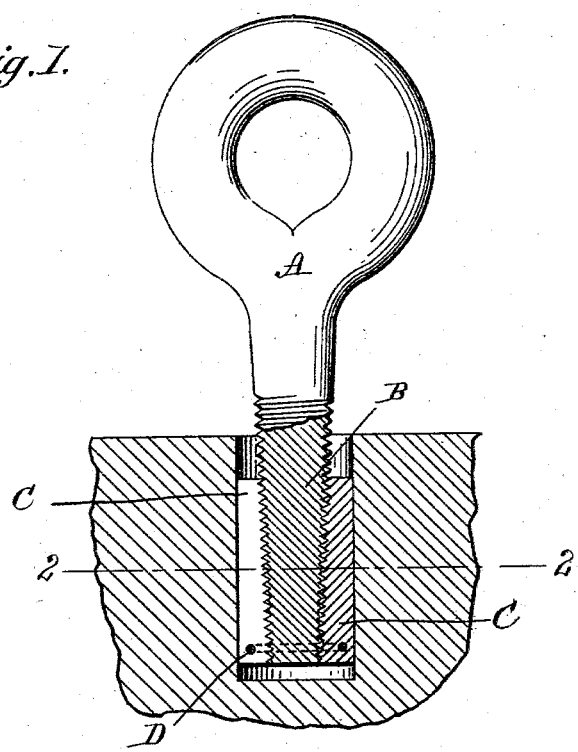
Figure 2:
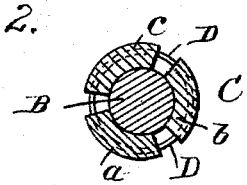
Figure 3:
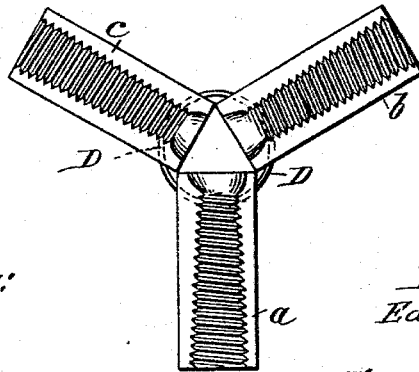

In the drawings forming part of this specification, Figure 1 is an elevation of an eyebolt having a tapered screw-threaded end in section and showing an expansible nut thereon and a portion of a block in section. Fig. 2 is a section taken on line 2 2, Fig. 1. Fig. 3 shows the three-part expansible nut as made ready for packing.

Referring to the drawings, A is the bolt, having the tapered screw-threaded end B, which engages with the similarly-threaded three-part expansible nut C. This nut C, which comprises the three sections *a*, *b*, and *c*, is made of cast-iron or other suitable metal, which sections are permanently united one to the other by a malleable uniting member D, said uniting member being bent up in any form which will most conveniently engage the extremities of the three segments of the nut C and placed in the sand mold after the three sections have been molded therein for casting, and the molten iron or other metal is then run therein, whereby the uniting member D becomes embedded in the extremities of the sections *a b c* of the nut, said nuts, when taken from the sand and pickled, being in the form shown in Fig. 3 ready for shipment.

To apply the nut to the tapered bolt, it is only necessary to bend up the three sections into contact with the end of the tapered bolt and insert the nut and bolt into the hole in the block to which the said bolt is to be attached. After said nut has been forced to the bottom of the hole, or sufficiently far therein to secure its effective engagement with the side walls of said hole, the bolt A is turned into said nut, expanding the same with great force against the said walls of the hole, whereby it is fixed therein for the purpose desired. The expansion of the nut does not rupture the uniting member D, and it may be used a large number of times.

If desired, instead of making the nut in the manner above described—viz., by casting the parts onto a malleable uniting member—said nut may be punched out of a piece of steel in the shape of a blank having the outline of the nut shown in Fig. 3, said blank being then submitted to the action of dies, by which the edges of the sections *a*, *b*, and *c* are beveled, and the screw-threads struck into the open faces of the said segments, and the surface of the segments *a b c* opposite the threaded face is rounded. When made in this manner, the nut presents a more finished appearance, but is of more expensive construction, and the first-described method of making the nut is the preferred construction.

The nuts made by punching out the blanks, leaving a malleable uniting member between each section and integral therewith, would still be within the scope of this invention, however, the essential point in which is the permanent union of the parts of the expansible nut by a malleable member, whereby, when so united, they may be used a number of times without destroying said member, and whereby the parts *a*, *b*, and *c* may always be in proper operative relation one to another.

Having thus described my invention, what I claim, and desire to secure by Letters Patent, is—

An expansible nut composed of two or more parts, having tapering screw-threads upon their inner sides; and a malleable wire cast in their inner ends for connecting them, combined with a tapering screw for expanding the parts of the nut, substantially as shown and described.

EDWIN B. BREWER.

Witnesses:
   H. A. CHAPIN,
   K. I. CLEMONS.